US011208027B1

(12) United States Patent
Rainone et al.

(10) Patent No.: US 11,208,027 B1
(45) Date of Patent: Dec. 28, 2021

(54) AUTOMATED, WIRELESS, CARGO RESTRAINT TENSION CONTROL AND MONITORING SYSTEM

(71) Applicants: Michael D. Rainone, Palestine, TX (US); Samuel A. Sackett, Frankston, TX (US); Adam C. Vance, Palestine, TX (US); Scotty J. Bammel, Palestine, TX (US); Thomas E. Crippen, Tyler, TX (US); Brook Grisham, Palestine, TX (US)

(72) Inventors: Michael D. Rainone, Palestine, TX (US); Samuel A. Sackett, Frankston, TX (US); Adam C. Vance, Palestine, TX (US); Scotty J. Bammel, Palestine, TX (US); Thomas E. Crippen, Tyler, TX (US); Brook Grisham, Palestine, TX (US)

(*) Notice: Subject to any disclaimer, the term of this patent is extended or adjusted under 35 U.S.C. 154(b) by 0 days.

(21) Appl. No.: 16/774,466

(22) Filed: Jan. 28, 2020

Related U.S. Application Data

(60) Provisional application No. 62/797,938, filed on Jan. 28, 2019.

(51) Int. Cl.
*B60W 50/14* (2020.01)
*B60P 7/08* (2006.01)
*G01L 1/00* (2006.01)

(52) U.S. Cl.
CPC .......... *B60P 7/0861* (2013.01); *B60W 50/14* (2013.01); *B60P 7/0807* (2013.01); *B60W 2050/143* (2013.01); *B60W 2050/146* (2013.01); *G01L 1/00* (2013.01)

(58) Field of Classification Search
CPC ............ B60W 50/14; B60W 2050/143; B60P 7/0861; B60P 7/0853; B60P 7/0838; B60P 7/083
USPC .......................................................... 410/103
See application file for complete search history.

(56) References Cited

U.S. PATENT DOCUMENTS

| 1,157,110 | A | | 10/1915 | Johnson | |
|---|---|---|---|---|---|
| 3,142,877 | A | * | 8/1964 | Lesley | F16G 11/12 24/68 CD |
| 3,809,832 | A | | 5/1974 | Burger | |
| 5,466,083 | A | | 11/1995 | Hogg | |

(Continued)

FOREIGN PATENT DOCUMENTS

| DE | 102010061459 A1 | * | 6/2012 | ............... B60P 7/083 |
|---|---|---|---|---|
| EP | 2471686 A1 | * | 7/2012 | ............... B60P 7/083 |
| WO | 2007/100315 | | 9/2007 | |

OTHER PUBLICATIONS

International Search Report for PCT Application No. PCT/US2006/005079, dated Jul. 17, 2008.

(Continued)

*Primary Examiner* — Hilary L Gutman
(74) *Attorney, Agent, or Firm* — Womble Bond Dickinson (US) LLP; Mark R. DeLuca

(57) ABSTRACT

A cargo restraint system a locking ring coupled to an extension tube, wherein the locking ring comprises an annular body and one or more tabs extending from the annular body. The cargo restrain system also includes a locking tube coupled to the main body. The locking tube comprises one or more grooves complementary to the shape and size of the tabs on the locking ring. The grooves of the locking tube inhibit rotational movement of the locking ring.

6 Claims, 13 Drawing Sheets

(56) References Cited

U.S. PATENT DOCUMENTS

| | | | |
|---|---|---|---|
| 5,730,541 | A | 3/1998 | Duett et al. |
| 6,666,634 | B1 * | 12/2003 | Hsieh .................... B63B 25/004 |
| | | | 114/75 |
| 7,014,399 | B1 * | 3/2006 | Hsieh .................... B63B 25/004 |
| | | | 410/77 |
| 7,399,148 | B2 * | 7/2008 | Bruun .................... B63B 25/24 |
| | | | 410/85 |
| 9,576,475 | B2 | 2/2017 | Bardin et al. |
| 10,814,773 | B1 * | 10/2020 | Rainone .................. G01L 5/047 |
| 2010/0158629 | A1 | 6/2010 | Morland |
| 2011/0000317 | A1 * | 1/2011 | Ruan ....................... B60P 7/083 |
| | | | 73/862.42 |
| 2014/0041926 | A1 | 2/2014 | McGuire et al. |
| 2016/0091050 | A1 * | 3/2016 | Dunmire .................. B60P 7/06 |
| | | | 24/68 CD |
| 2016/0146683 | A1 | 5/2016 | Chau et al. |
| 2017/0182927 | A1 * | 6/2017 | Brewster ............... B60P 7/0853 |
| 2017/0203680 | A1 * | 7/2017 | Mahaffey ................ F16G 11/12 |
| 2018/0251063 | A1 * | 9/2018 | Helline ................. B60P 7/0853 |
| 2019/0031079 | A1 * | 1/2019 | Robins .................... B63B 25/24 |
| 2019/0338831 | A1 * | 11/2019 | Squires .................. F16G 11/12 |

OTHER PUBLICATIONS

Written Opinion for PCT Application No. PCT/US2006/005079, dated Jul. 17, 2008.

International Preliminary Report on Patentability for PCT Application No. PCT/US2006/005079, dated Mar. 10, 2009.

\* cited by examiner

AUTOMATED, WIRELESS, CARGO RESTRAINT TENSION CONTROL AND MONITORING SYSTEM

PRIORITY CLAIM

This application claims priority to U.S. Provisional Application Ser. No. 62/797,938 entitled "AUTOMATED, WIRELESS, CARGO RESTRAINT TENSION CONTROL AND MONITORING SYSTEM" filed Jan. 28, 2019; which is incorporated herein by reference in its entirety.

BACKGROUND OF THE INVENTION

Field of the Invention

The invention generally relates to cargo restraint systems. More specifically, the invention relates to cargo restraint systems that include a smart controller that monitors the status of the cargo restraint system.

Description of the Relevant Art

The restraint of cargo is one of the critical technologies for the movement of all logistics. Shifting and loose cargo on any vehicle threatens the vehicle, those piloting the vehicle and those near the vehicle who may be impacted by the cargo if it is accidentally released. Almost daily there are news stories about drivers and passengers of vehicles that are injured, or even killed, by cargo that has been accidentally released from trucks and cars or becomes loose and moves within the transporting vehicle. In addition, in many locales, drivers of heavy carry trucks are required to constantly stop their vehicle and inspect the cargo restraints to ensure that the load cannot get loose. Such stops are dangerous and time consuming. Passive tie down systems are incapable of alerting the drivers that the load has shifted, the restraint has come loose or even that the cargo has been lost. In addition, many pieces of cargo, such as large air conditioning units, require a limited holding force to ensure that the cargo is not bent, distorted or ruined by overtightening, which increases the probability of a loosening event.

In addition, many of workers are reaching the end of their careers such that the effort to secure the cargo often results in strains and injury. The restraint devices such as chains and binders are heavy, require crawling around the vehicle, dragging such devices around the load, and lacing chains in and around the lashing points, activities which become more difficult as one ages. In addition, regardless of age, securing cargo is a time-consuming activity and anything that reduces the time involved will produce significant cost savings.

Current methods of securing cargo utilize binders, straps and chains that give the user no knowledge of how much force is being used to hold down the cargo. In addition, the "dumb" security devices have no means of informing the user if and when a securing device has or will loosen to the point of losing the cargo.

SUMMARY OF THE INVENTION

The devices described in this disclosure are designed to reduce the risk of loose cargo by monitoring the tension on the load electronically and alerting the driver or other stakeholders regarding the level of tension placed on the cargo. The device further automatically adjusts the tension on the device (tightens or loosens), which should reduce over tensioning on sensitive loads, speed up the securing process and minimize the time spent checking the load. Finally, reducing the effort needed to secure the load reduces injuries and fatigue encountered in the process of securing the load.

In an embodiment, a cargo restraint system includes a body, a first connecting end and a second connecting end on opposing sides of the body, wherein the first and second connecting ends are coupled to a securing member which is used to restrain the cargo. One or more load sensors are coupled to the first connecting end and/or the second connecting end. A controller is coupled to the one or more load sensors. The controller is configured to receive tension information from the one or more load sensors. The controller includes a transmitter capable of transmitting the tension information to a remote device.

In another embodiment, a cargo restraint system includes a body, a motor disposed in the body and a drive screw coupled to the motor, extending from the main body. An extension tube is coupled to the drive screw. The extension tube comprises threading complementary to the threading on the drive screw. During use rotation of the drive screw causes the extension tube to move away from the main body, or move toward the main body, depending on the direction of rotation of the drive screw. The cargo restrain system also includes a connector coupled to the extension tube. A locking ring is coupled to the extension tube. The locking ring comprises an annular body and one or more tabs extending from the annular body. A locking tube is coupled to the main body and at least partially surrounds the extension tube. The locking tube includes one or more grooves complementary to the shape and size of the tabs on the locking ring. The grooves of the locking tube inhibit rotational movement of the locking ring.

The cargo restraint system may also include one or more fasteners coupling the locking ring to the extension tube. The fasteners are made from a material having a shear strength of at least about 100 mPa but less than about 1000 mPa. In some embodiments, the fasteners are made from aluminum.

In an embodiment, a method of restraining cargo includes: coupling the ends of a cargo restraint system, as described herein, to a cargo carrier and a vehicle. A motor of the cargo restrain system is operated to increase the tension on the securing member to secure the cargo.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
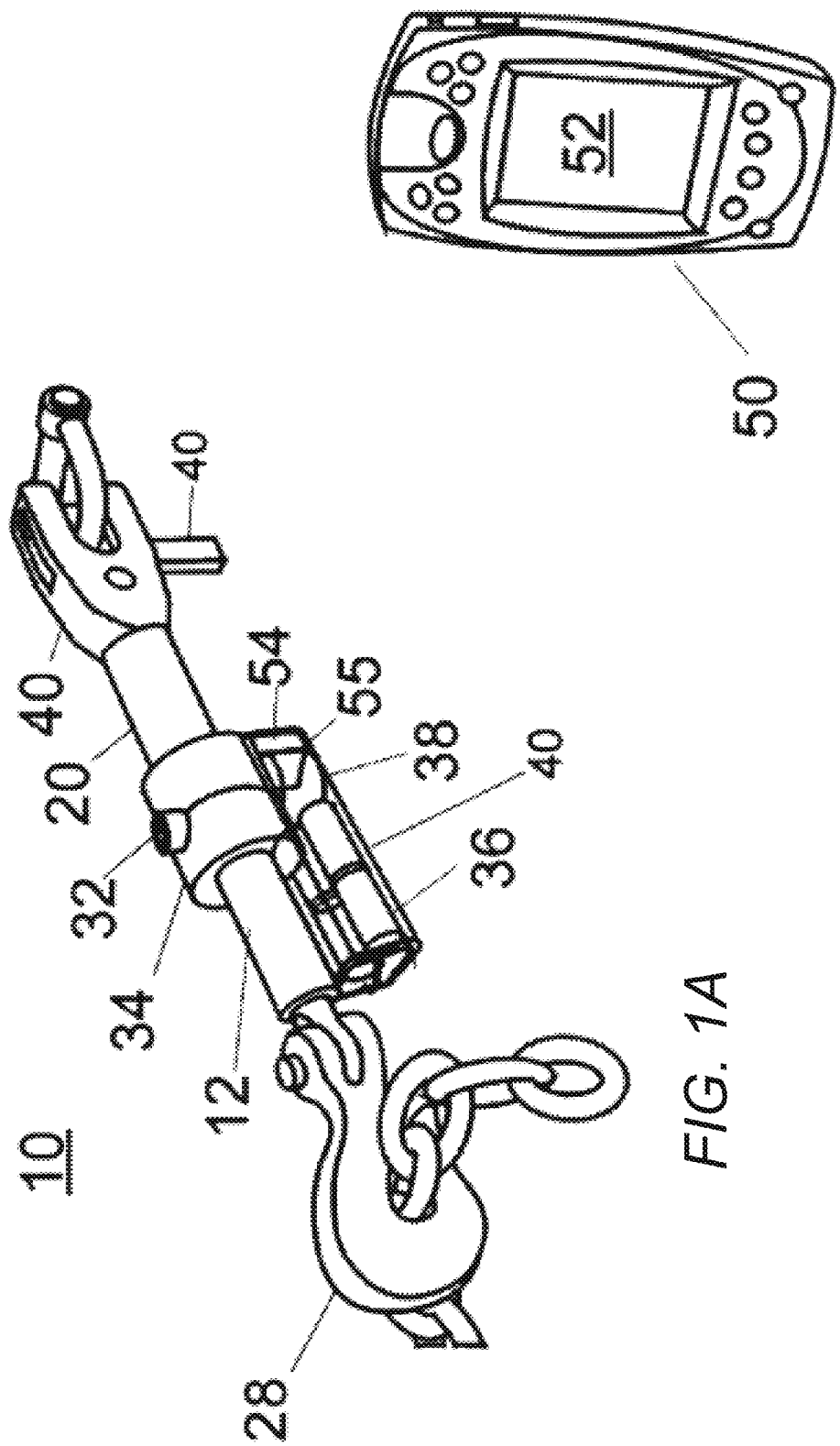
FIG. 1A is a perspective view of an embodiment of a cargo restraint system.
FIG. 1B is a perspective view of a remote controller for a cargo resistant system.
Figure 2:
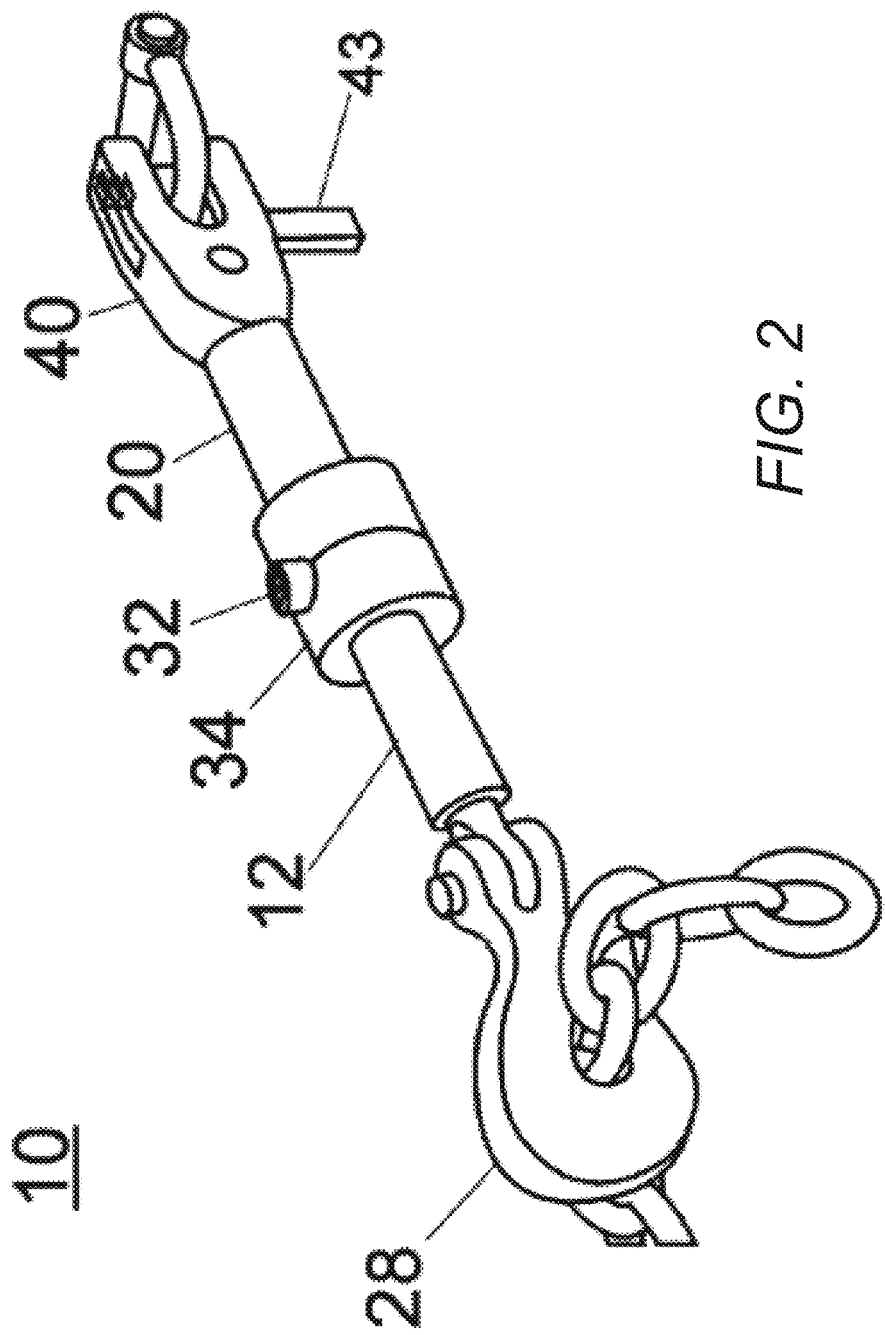
FIG. 2 is an isometric drawing of a powered restraint system in the embodiment of FIG. 1.
Figure 3:
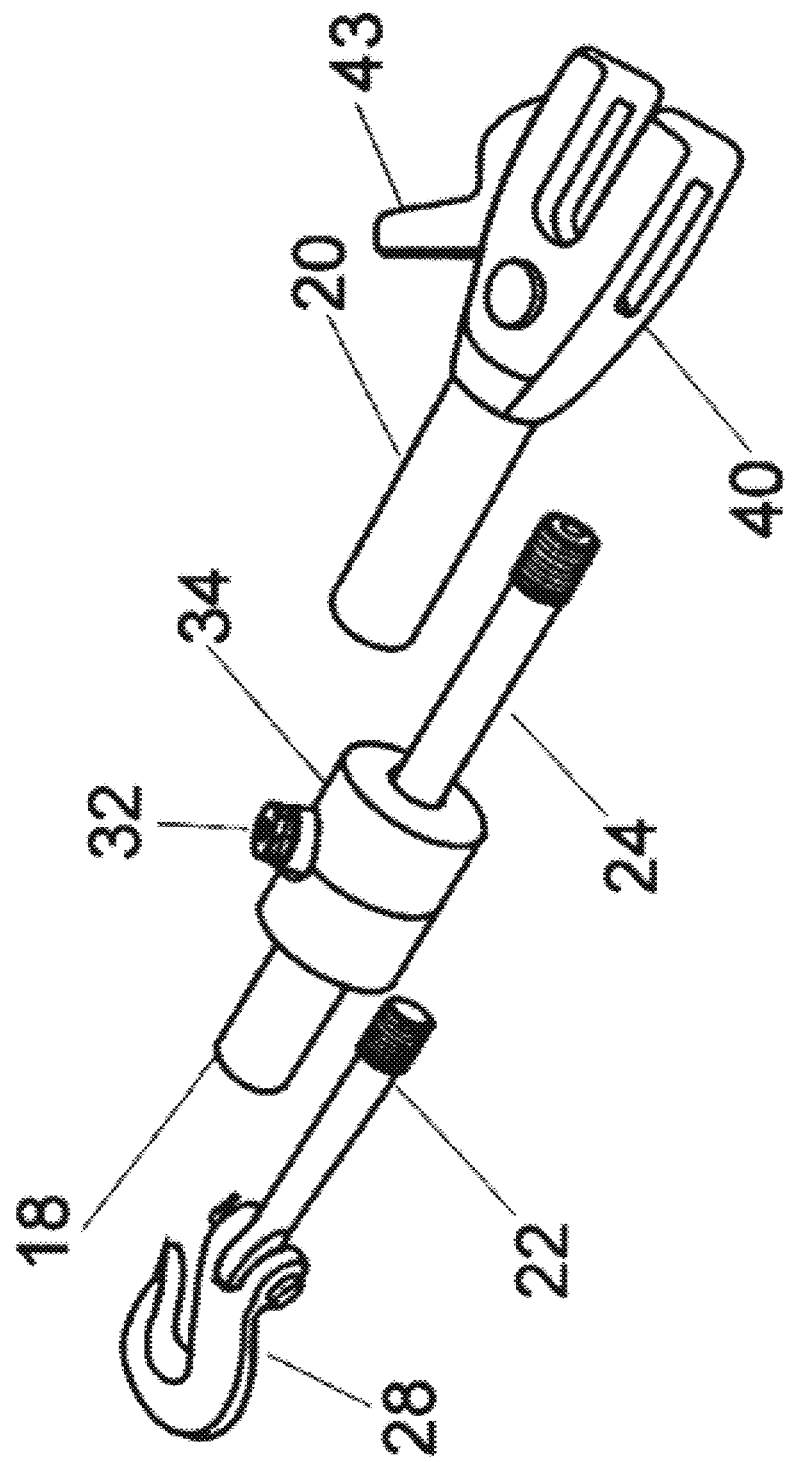
FIG. 3 is an exploded view of the powered restraint system of FIG. 2.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Figure 4:
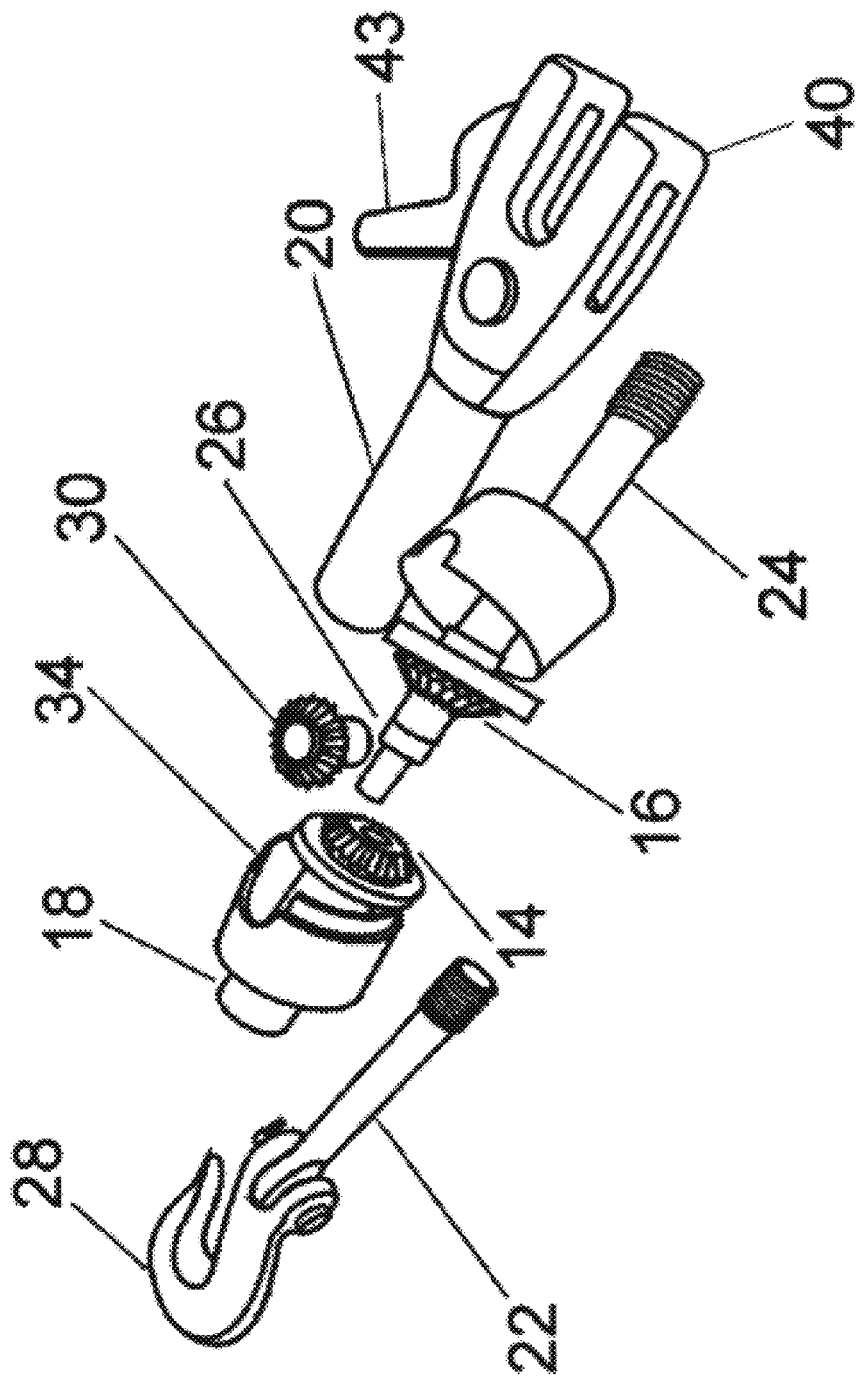
FIG. 4 is a view of the powered restraint system of FIG. 2 shown in disassembled condition.
Figure 5:
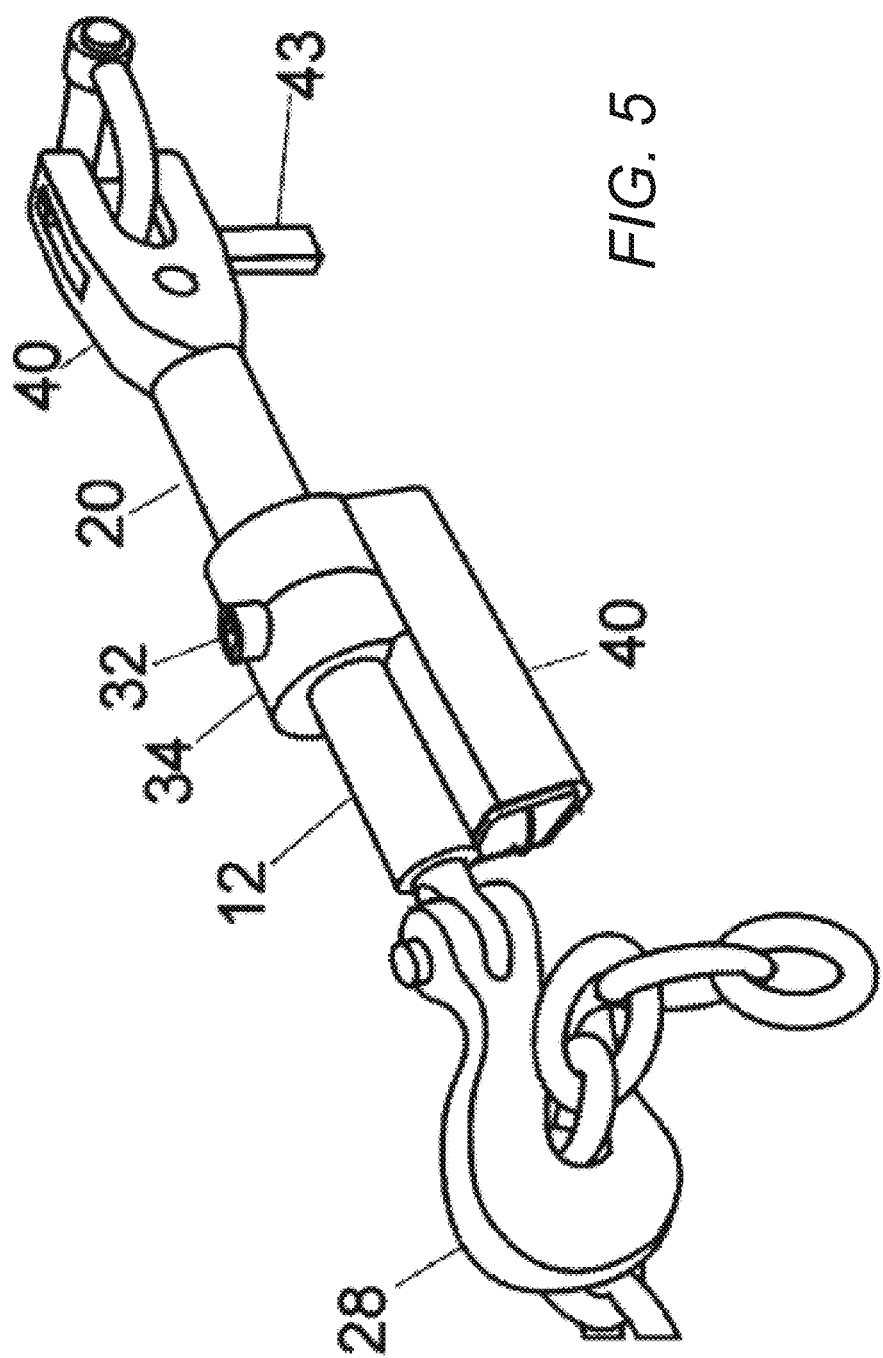
FIG. 5 is an isometric drawing of the assembly of FIG. 2 with a power unit added thereto.

Referring to FIGS. 1-8, there is shown a first embodiment of a cargo restraint system 10. As shown in FIG. 1, system 10 includes a powered restraint system 12 that is used to create a self-tightening and self-releasing restraint system. In accordance with one aspect of the invention, the cargo restraint system uses an arrangement of high strength bevel gears as shown in FIG. 4. In particular, system 10 employs a hook receiver bevel drive gear 14, coupled to an internally threaded hook receiver 18, and a claw screw bevel drive gear 16 which is coupled to exterior threaded claw receiver 24. Hook receiver bevel drive gear 14 and claw screw bevel drive gear 16 each revolve around a forged central axle 26. Threaded hook receiver 18 may be coupled with hook 28 via complementary threading on hook shaft 22. Threaded claw receiver 24 may be coupled to claw 40 via complementary internal threading in the hollow claw shaft 20. The receivers (18, 24), attached to the bevel gears, are driven by driver bevel gear 30, which is attached to the central axle. When the drive bevel gear 30 is rotated, the bevel gears (14, 16) on the receiver tubes rotate in the same direction. If the driver bevel gear 30 is rotated counterclockwise, both receiver bevel gears (14, 16) rotate clockwise, which cause receivers (18, 24) to also rotate clockwise, being directly coupled to the receiver bevel gears. Rotation of hook receiver 18 in a clockwise direction causes hook shaft 22 to be drawn into receiver tube 18, toward the central drive mechanism. Similarly, rotation of claw receiver 24 in a clockwise direction causes claw shaft 20 to be drawn over claw receiver 24, toward the central drive mechanism. When a securing member (e.g., a chain, cable, rope, etc.) is coupled to hook 28 and claw 40, the securing member is tightened around the cargo when the receivers are drawn toward the central section of the system. If the driver bevel 30 is rotated clockwise, the securing member is loosened. It is estimated that an electric motor or impact wrench, coupled to driver bevel gear 30, with a peak torque of 250 ft-lbs would easily spin the drive gears even under severe loads.

In some embodiments, the restraint system components include: a hook shaft 22, a hook receiver 18, a hook receiver bevel drive gear 14, a drive bevel gear 30, a manual drive receptacle 32 (see FIG. 3), an central axis pin 26, a claw screw bevel drive gear 16, a main housing 34, a battery 36 (see FIG. 8A), a motor 38 (see FIG. 8A) and electronic housing 40 (see FIG. 8A), a claw screw 24 (see FIG. 4), and a claw receiver 20 (see FIG. 4). The components are preferably of forged steel construction and sealed to the environment. The assembly 10 is insensitive to extreme heat or cold. A quick manual override of the motor-powered system is provided by means of manual drive receptacle 32.

In one embodiment, a quick release claw 40 is designed to hold a securing member when engaged, and to lock in such a way that load shifting will not cause the securing member to be released while tightening. Claw 40 will also be configured to release the securing member, either by manual opening of the claw, or when instructed by a remote controller, as will be hereinafter described in further detail. In an embodiment, securing member may be released through direct intervention by manual application of force on release tab 43.

Figure 6:
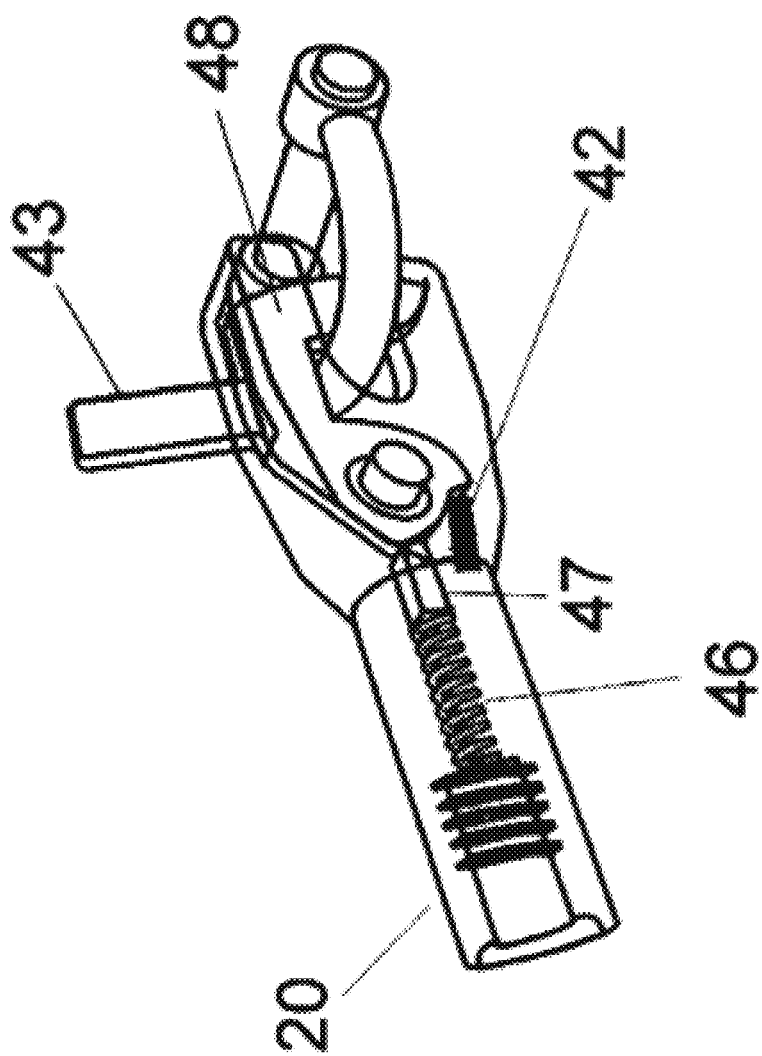
FIG. 6 is a partially cut-away perspective view of a quick release hook assembly.
Figure 7:
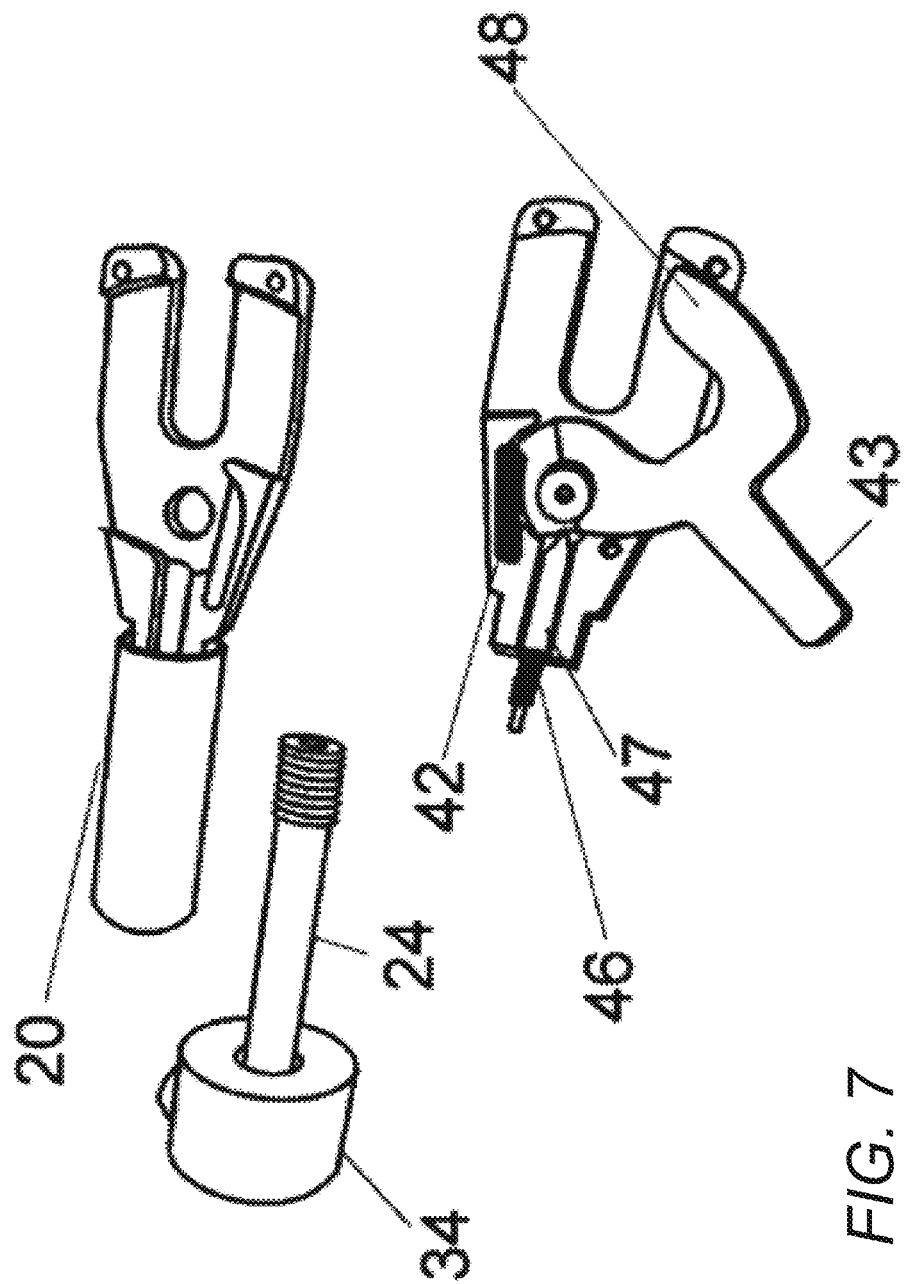
FIG. 7 is a view of the quick release hook assembly with its components disassembled.
Figure 8:
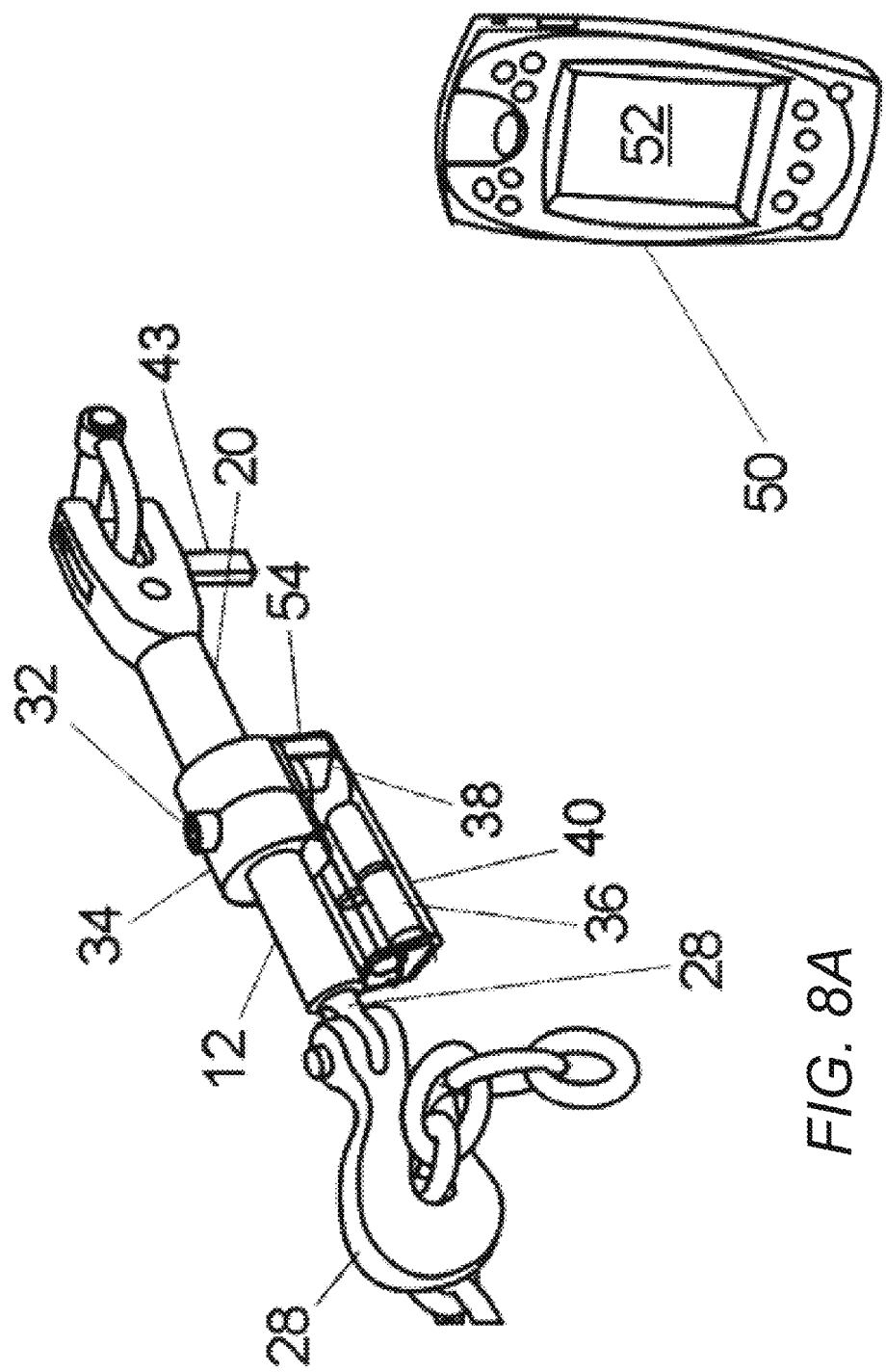
FIG. 8A is a perspective view of an embodiment of a cargo restraint system.
FIG. 8B is a perspective view of a remote controller for a cargo resistant system.

With reference especially to FIGS. 6 and 7, the quick release hook components include a claw shaft 20, a claw actuator spring 42 (see FIG. 6), a detent 47, a spring assembly 46, and a claw 48. The components are of forged steel construction and, preferably sealed to the environment.

In one embodiment, the cargo restraint system includes an internal controller 54 which monitors and interprets signals coming from load sensors, motor and battery, internal to the restraint system 10, as well as control signals from remote control 50, as will be described hereinafter in further detail (FIG. 8B). Internal controller 54 within housing 40 sends data from the restraint system 10 to the remote control 50, including, but not limited to, such information as battery strength, the load on the restraint system, a unique identification of the restraint system, and whether the restraint system has been released and dropped to the ground. Furthermore, internal controller 54 can receive data from remote control 50 and act on it in order to perform certain functions, including, but not limited to, order the load to be released, order the tension on the load to be increased or loosened in transit, and, after release, order restraint system 10 to extend to a fully released position.

Remote control 50, shown in FIG. 1B, allows the user to interact, remotely, with the restraint system 10. In one embodiment, remote control 50 is a hand-held transceiver with a keypad, barcode scanner, and LCD display. In one embodiment, controller 50 monitors and stores information coming from multiple individual restraint systems. Such information may include, without limitation, a unique identifier (ID) of one or more of the tensioning stations; the condition of one or more of the tensioning stations; remaining battery life in one or more of the tensioning stations; the current load on one or more of the tensioning stations; and error conditions exhibited by one or more of the tensioning stations. Controller 50 preferably includes a mapping and display capability so that a graphical representation of the location of one or more of the tensioning stations can be provided, and information regarding the status of each mapped tensioning station associated with the graphical representation. The controller 50 is capable of sending a release signal to one or more of the tensioning stations, and can obtain the ID of each tensioning station when it is installed so that it can be identified and located. Controller 50 further preferably communicates with a computer system, so that the information regarding the tensioning stations may be stored and communicated to various relevant parties.

Restraint system 10 also includes one or more sensors 55 (see FIG. 1) that measure and monitor the operating parameters of the system. Sensors that may be incorporated into the restraint system include a sensor for detecting the tension on the securing member. Additional sensors may be used to determine if the securing member is properly engaged with the hook or the claw, and if the restraint system has been disengaged from the securing member. Accordingly, sensors 55 may be configured to determine when grip is dropped to the floor and fully disengaged. In addition, for the fastest redeployment, the grip should be in its fully extended mode when the crew is trying to attach the grip to the vehicle. In this way, the grip has the greatest amount of take-up distance when attached to the securing member. A sensor may be used to tell the system when the components of the restraint system are fully extended. Finally, an underway tension adjustment methodology is incorporated in the internal controller and/or the remote controller. A control algorithm is used by either controller to balance the need to keep the cargo secure with the control problem of tension "seeking" (i.e. detensioning and over tensioning), battery life, allowable tensioning limits, and so on.

In embodiments which include a motor drive for the turnbuckle, a power source 36 for the motor drive is preferably one selected to strike a balance between power, power density, safety, longevity, cost, and other factors. Lithium batteries show distinctive advantages in weight over other types of batteries. In one embodiment, a quick charge Aerogel Capacitor is used to power the motor drive. In a preferred embodiment, each restraint system includes a battery that will allow the restraint system to be used at least fifty times without recharging. Battery should provide sufficient power to the motor to allow the restraint system to secure the cargo within 45 seconds and unwind within 30 seconds on arrival of the cargo at its final destination. This provides an overall time savings in the loading/unloading part of the transportation of cargo of 50% to 70%. Advantageously, disembarking time is only limited by the time it takes to move the cargo off of the carrier.

For embodiments which incorporate a motor drive 38 for the turnbuckle, the motor may be a Quadrant System radially wound, electronically commutated, brushless motor (ECBM). The Quadrant is a variety of ECBM that uses a powdered metal stator to reduce eddy losses, and has a theoretical one pound to one horsepower output. In one embodiment, motor drive 38 can be made in a wide variety of aspect ratios (diameter to height) without significant changes in efficiency. The motor power is in the 400- to 500-watt range, and the motor weighs on the order of 14 ounces, and is estimated to have 350 in/lbs, of torque. In a specific embodiment, the motor is approximately 400 watts at 18 volts, with a diameter of 70 mm and a height of 40 mm. The motor drive preferably uses a powdered metal stator and rotor and state-of-the-art magnetic material for a potential of a 1 hp, 1 pound. As a delivered "system" it will weigh approximately 18 lbs for a 15% savings.

In some embodiments, restraint system is a fully automated grip that will self-tighten once attached, maintain its tension while underway, and remotely unlash and drop away from the cargo with no human interventions at the disembarking location. In a fully-featured implementation, the restraint system is designed to monitor its own operational status and let users know when operational intervention is required, such as recharging, maintenance, or relocation.

In accordance with another important aspect of the invention, in a given implementation a system having fewer than all of the optional functional elements described herein can be provided. At the lowest end, the restraint system itself, with an off-the-shelf drill-driver to power it, might be deployed without inclusion of a motor, sensor, or electronics of any type. Such a simple implementation of the invention still offers significant benefits and improvements in lashing/unlashing times as compared with prior art systems.

In another implementation a simple battery-powered tension sensor may be included.

Figure 9:
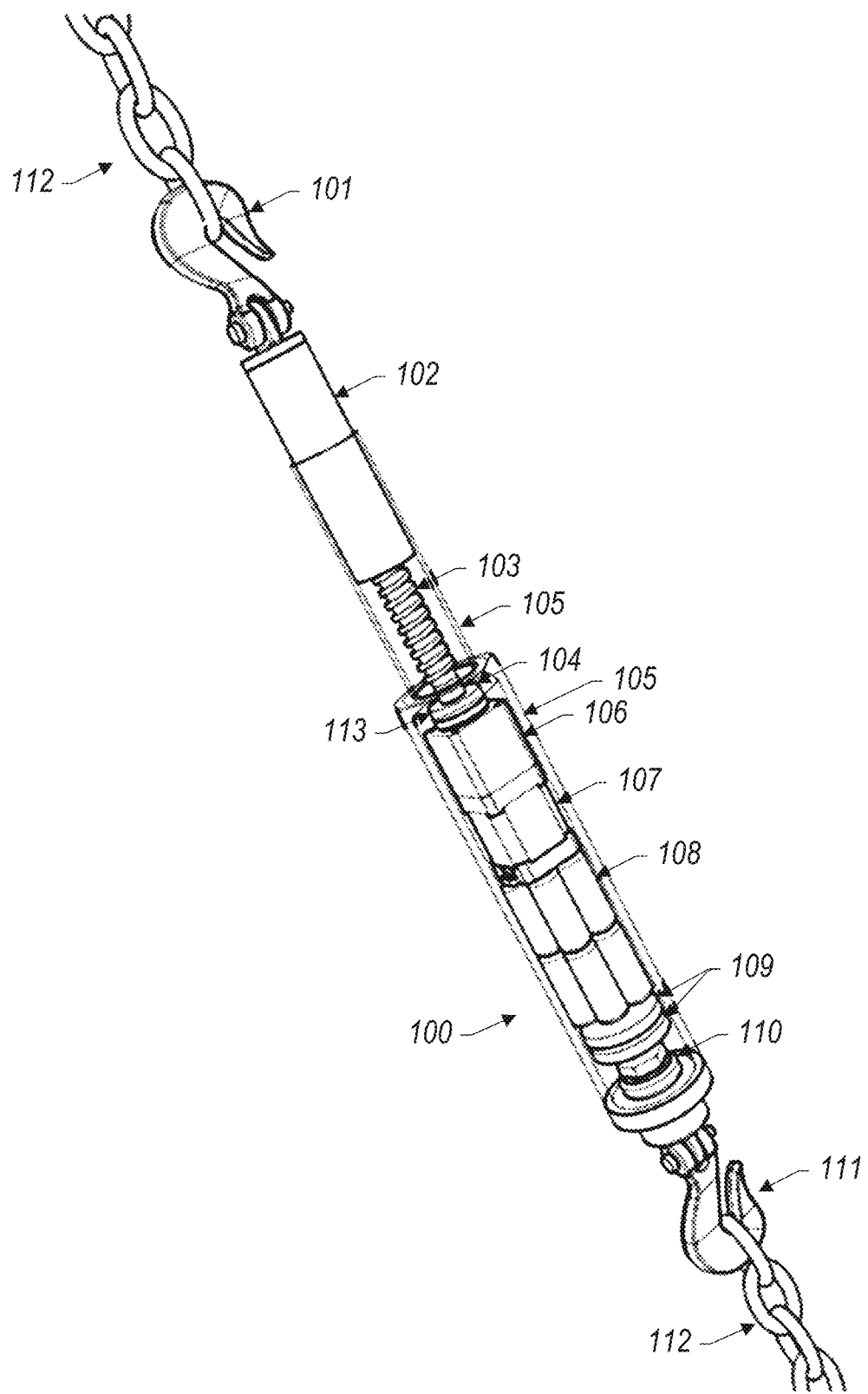
FIG. 9 is a perspective view of an alternate embodiment of a cargo restraint system.

An alternate embodiment of a cargo restraint system 100 is shown in FIG. 9. Restraint system 100 includes a motor 107, a gear reduction drive 106, a battery pack 108, controller/communication boards 109, and a load cell 110. A screw thread 103 is rotated by motor 107, through the gear reduction drive 106 and a thrust load bearing 104. Screw thread 103 is complementary with internally threaded load tube 102 which is connected to a hook 101. Hook 101 may be fastened to a securing member (e.g., chain 112). A second hook 111 is coupled directly to housing 105. Thus, in contrast to the previous embodiment, second hook 111 is not pulled or pushed from the housing, but instead remains at a fixed position to the housing. While the use of hooks is depicted in this embodiment, it should be understood that any kind of connector may be used to couple the restraint system with the securing member, including hooks and claws described earlier). In an embodiment, second hook 111 may not be present and the end where the hook was attached may be fastened directly to the cargo being secured or to the trailer/vehicle carrying the load. Load cell 110 includes one or more sensors that determine the tension on the restraint system when the system is engaged with cargo. An alternate embodiment may use a tension and/or compression measuring device that is integrated into the body 105. An alternate embodiment may use a microprocessor and transceiver for the controller/communication boards.

Motor 107, whether AC or DC, generates the force necessary to pull hook 101 inward into the housing body 105 to tighten the load. Motor is reversible and can reverse the direction to move the hook away from the housing body. This allows chain 112 to loosen, allowing the chain to be disengaged from hook 101 and released from the cargo. Motor 107 drives though a gear reduction device 106 to multiply the force of the motor to deliver sufficient tension to the chain or securing strap to hold the cargo. Gear reduction device 106 may be any combination of planetary gears, spur gears or a harmonic drive capable of multiplying the rotational torque from the motor to tighten and hold the load as required. Operation of motor 107 and gear reduction drive 106 drives the screw thread 103 which multiplies the force of the pull and thus tightens the chain 112, increasing the tension on the chain.

The screw thread device 103, fixed to gear reduction drive 106, applies the force through the housing body 105 though a thrust bearing 104 sandwiched between the screw thread flange 113 which is fixed to the distal end of screw thread device 103 and the housing body 105. Thus, housing body 105 is the load carrying member that conducts the tensioning force through the chains 112 to the hooks (101, 111) through the internally threaded load tube 102 though the screw thread device 103 which is loaded onto the screw thread flange 113 onto and through the thrust bearing 104 which then loads the housing body 105.

Motor 107 is powered by batteries 108. In some embodiment, motor 107 may be powered by an external power source. Batteries 108 could be charged from an external source though a charger hookup external to the unit or the charger circuit could be added to the microprocessor controller board 109.

Figure 10:
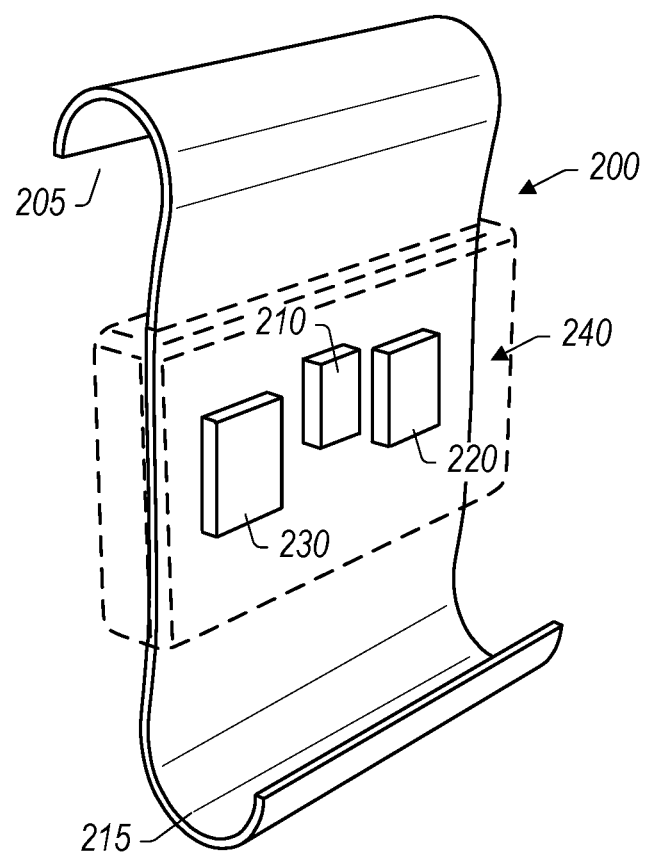
FIG. 10 is a perspective view of a cargo restraint clip.

An alternate embodiment of a cargo restraint system is depicted in FIG. 10. Cargo restraint system 200 acts as a clip that couples the ends of a securing member, but does not provide a device for tensioning the securing member. Restraint system 200 includes a first connecting end 205 and a second connecting end 215 on opposing sides of the restraint system. While connecting ends are depicted as curved ends, a connecting end can be in any configuration that allows it to be coupled to a securing member being used to secure cargo. For example, connecting ends may be in the form of hooks or claws (including hooks and claws described earlier) and may be in a quick release configuration.

Restraint system 200 includes a load sensor 210 which measurers the tension between first connecting end 205 and second connecting end 215. Load sensor 210 is coupled to microprocessor/transmitter 220. Microprocessor/transmitter 220 collects tension information from load sensor 210, stores and/or processes the tension information, and transmits the information to a remote controller or remote computer. In an alternate embodiment, the microprocessor/transmitter 220 could be a microprocessor/transceiver wherein commands and/or parameters are sent to the device. A display (not depicted) may be attached to the housing 240 of the electrical components. The display may be coupled to microprocessor/transmitter and display a tension measurement collected by the load sensor. A battery 230 may be disposed in housing 240 to provide power to the microprocessor/transmitter and the load sensor. In an embodiment, battery 240 is a rechargeable battery.

Figure 11:
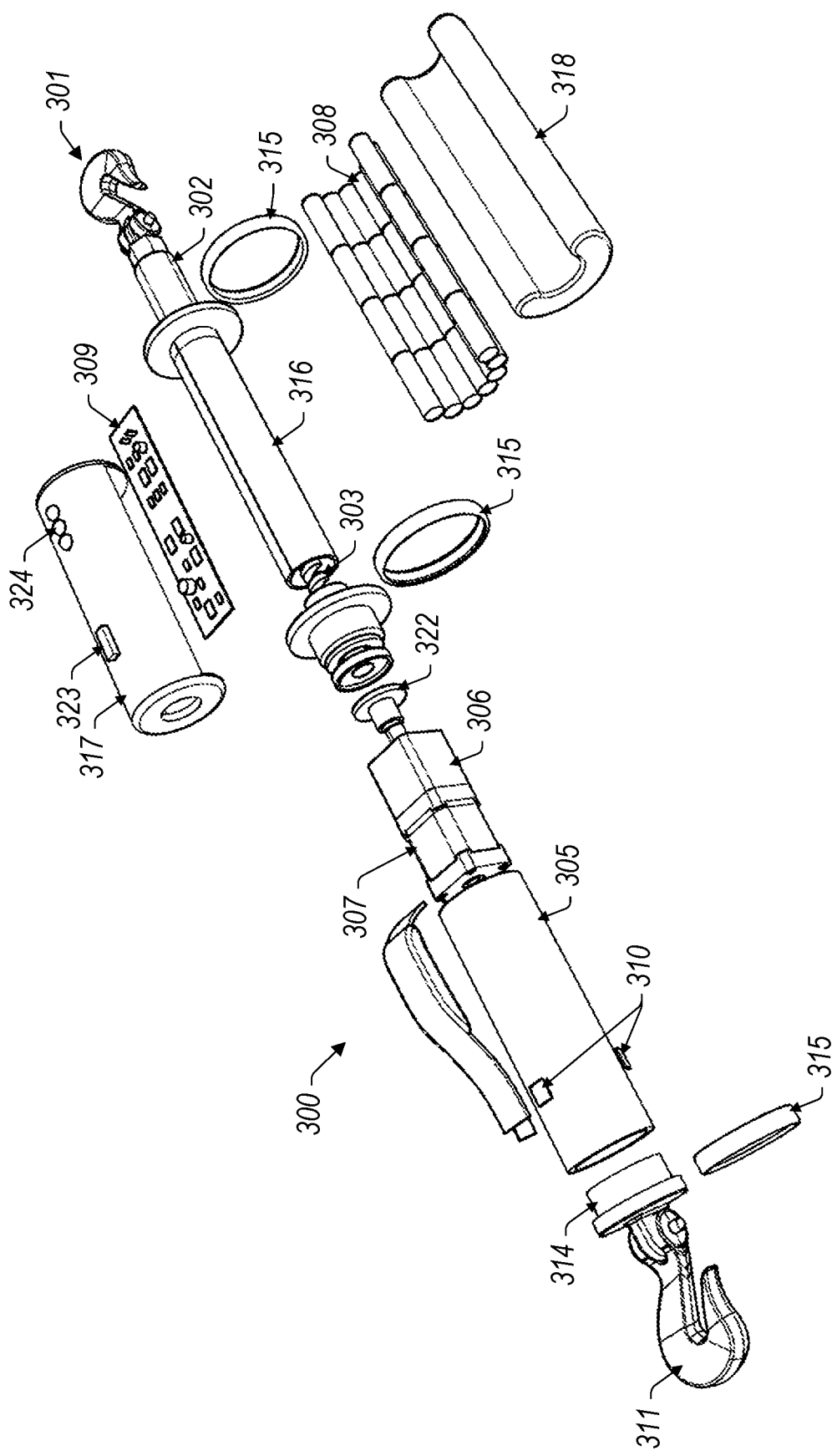
FIG. 11 is an exploded view of a cargo restraint system.

Another embodiment of a cargo restraint system 300 is shown in FIG. 11. Restraint system 300 includes a motor 307, a drive 306, a battery pack 308, controller/communication boards 309, and load sensors 310. In one embodiment, drive 306 may be a harmonic drive, in another embodiment, drive 306 may be another gear reduction mechanism such as a planetary gear. A drive screw 303 is rotated by motor 307, through the drive 306 and a thrust load bearing 304. Drive screw 303 is coupled to main load carrying connector 320 via complementary thrust carrier connectors 321 and 322. Drive screw 303 threading is complementary with internally threaded load tube 302 which is connected to upper hook 301. Hook 301 may be fastened to a securing member (not shown). A bottom hook 311 is coupled to the main case 305 via a bottom load carrier 314. Elastomer rings 315 are used between the various components to create a dirt and moisture resistant barrier and to reduce vibration in the system. While the use of hooks are depicted in this embodiment, it should be understood that any kind of connector may be used to couple the restraint system with the securing member, including hooks and claws described earlier).

As discussed in previous embodiments, motor 307 generates the force necessary to pull hook 301 inward into the load carrier cover 316 to tighten the load. Motor is reversible and can reverse the direction to move the hook away from the housing body. Motor 307 is powered by batteries 308. Batteries 308 and microcontroller/transmitter electronics 309 are positioned in a cavity defined by upper case 317 and battery case 318. An operation button 323 is disposed on the upper case 317. During use, a user of the device can initiate tensioning or release of tension using the operation button. One or more indicators 324 are also coupled to the upper case. Indicators can be used to indicate the various operating states of the system.

The controller/communications assembly in each of the embodiments described herein includes a controller board which receives values corresponding to the amount of tension placed on the device, through tensioning on the chain, by communicating with the tension sensors (e.g., load cell 110). A microcontroller in controller/communications receives tension information from a tension sensor and processes the tension information to filter out the "noise." As used herein, the term "noise" refers to the changes in tension produced by movement of the securing member and/or the cargo. Noise filtering smooths the tension data to allow the system to ignore slight changes in tension that result from these movements. After noise filtering of the tension data, the filtered tension information is used by the controller to determine if the securing member is undergoing a loosening or tightening which requires adjustment of the tension applied by the securing member to the cargo.

In one embodiment, noise filtering is done by measuring the initial tension on the restraint system when the cargo is secured. This sets a baseline tension measurement. Noise is then defined as a percentage of the baseline tension (e.g., 10%). Any tension values subsequently measured that are within ±10% of the baseline tension can be considered noise and the information discarded or ignored. If the tension changes by more than the predetermined percentage, then an alert is sent to check the cargo and adjust the position of the cargo or the tension on the securing member, as appropriate.

Noise can also be defined based on the time that the tension on the securing member is changed with respect to the baseline tension measurement. For example, if the tension is rapidly changing (i.e. changes values in less than one minute), it could be assumed that the change is due to slight movement of the cargo or movement of the transportation vehicle for the cargo. However if the tension changes and remains outside the baseline tension for a set time (e.g., one minute), an alert may be raised to indicate that the restraint system needs to be checked and the tension adjusted.

In an embodiment, noise levels are determined using a smart learning approach. Rather than just basing noise on a percentage of an initial measurement value, noise can be determined by constant monitoring of the tensions on the cargo, and using the tension data to determine how much variation in tension occurs during transport of the cargo. Applying statistical analysis and taking account the transportation conditions, a more sophisticated noise model is created. The noise model is used by the controller to determine when the tension of the securing members on the cargo is outside of an acceptable range. The use of a noise model can help prevent false positives.

In addition, the controller board/load cell combination is designed to help the user to know how much force is being applied to the load during the tie-down process. During the tie-down process the device reads the load cell through the microprocessor and then communicates that information through the communication board to the remote control. The data may be communicated via Wi-Fi, over the internet to a laptop, or smart phone or if the user's vehicle has a Wi-Fi connection, the vehicle, or via Bluetooth directly to the user's smart phone or the through a separate RF receiver which then may be sent over the Internet via Wi-Fi. Thus, the communication board can have multiple communication modalities: Wi-Fi, Blue Tooth, RF or even through Near Field Communication as required. Such communication capabilities allow others besides the adjacent user to oversee the tensioning process and then to monitor load throughout transit, through the Internet via Wi-Fi, smart phone, direct satellite link, RF or other wide range technology.

In another embodiment, preset loads are programmed into the microprocessor to insure a minimum load is attained or to insure that an overtensioning event does not happen upon loading or during transit. In the case of a loosening event while underway, the device can be programmed to attempt to automatically re-tension up to the load limit as well as alerting the user of the event. The load information is determined, to some extent, by the mass of the cargo. Based on the mass of the cargo, and the initial tension, the controller may set a deviation value (e.g., 10%) which represents the tension that will trigger an alert or change by the system.

The system can be programmed or commanded to release the load by unwinding at the destination, thus speeding up the unloading process. Proper security algorithms can be utilized to keep the load from being released inappropriately by the user or by hackers.

The system may be capable of transmitting locational information. In an embodiment, a GPS may be included to determine and report the location of the cargo restraint system. This could assist the user with tracking the location of cargo being transported, or to ensure the cargo restraint system is not left behind during use (i.e. loading, unloading, etc.). The unique identifier of each cargo restraint system may also be used to quickly determine the number of available and active devices on the truck to quickly assess if adequate devices are available for transporting cargo, or to ensure that none of the devices are left behind at a location. A Local Positioning System (LPS) algorithm may be used to determine the relative position of the cargo restraint system with respect to the smart controller (located on the truck) to ensure that cargo restraint systems are not lost or stolen.

Cargo restraint system may be engaged or disengaged via a remote controller or smart phone app. A switch on the cargo restraint system may be disabled via the remote controller, or smart phone app, for security purposes with the benefit of being notified of changes in tension when the load is parked/not moving.

The controller allows controlling, monitoring and adjusting multiple cargo restraint restraint systems. For example, when securing a load, a multiple of CRTS tension to a preset force, equalizing among the CRTS.

In an embodiment, transport data is captured and analyzed to automate load tensioning. Transport data may include capture: tension level over time, geographic position and type of cargo. Transport data may be stored in a database. The captured transport data may be provided as an input to the auto-tensioning and monitoring of loads.

The controller may also provide additional information such as battery life and the status of other components of the cargo restraint system.

The internal controller may include learning capabilities which assist in determining the preset tension limits. For example, capture data on equipment type and configuration (e.g. Case 580C front end loader, etc.), analyze algorithmically, and place into a database for future reference to configure cargo restraint systems and automatically tension equipment during loading.

Figure 12:
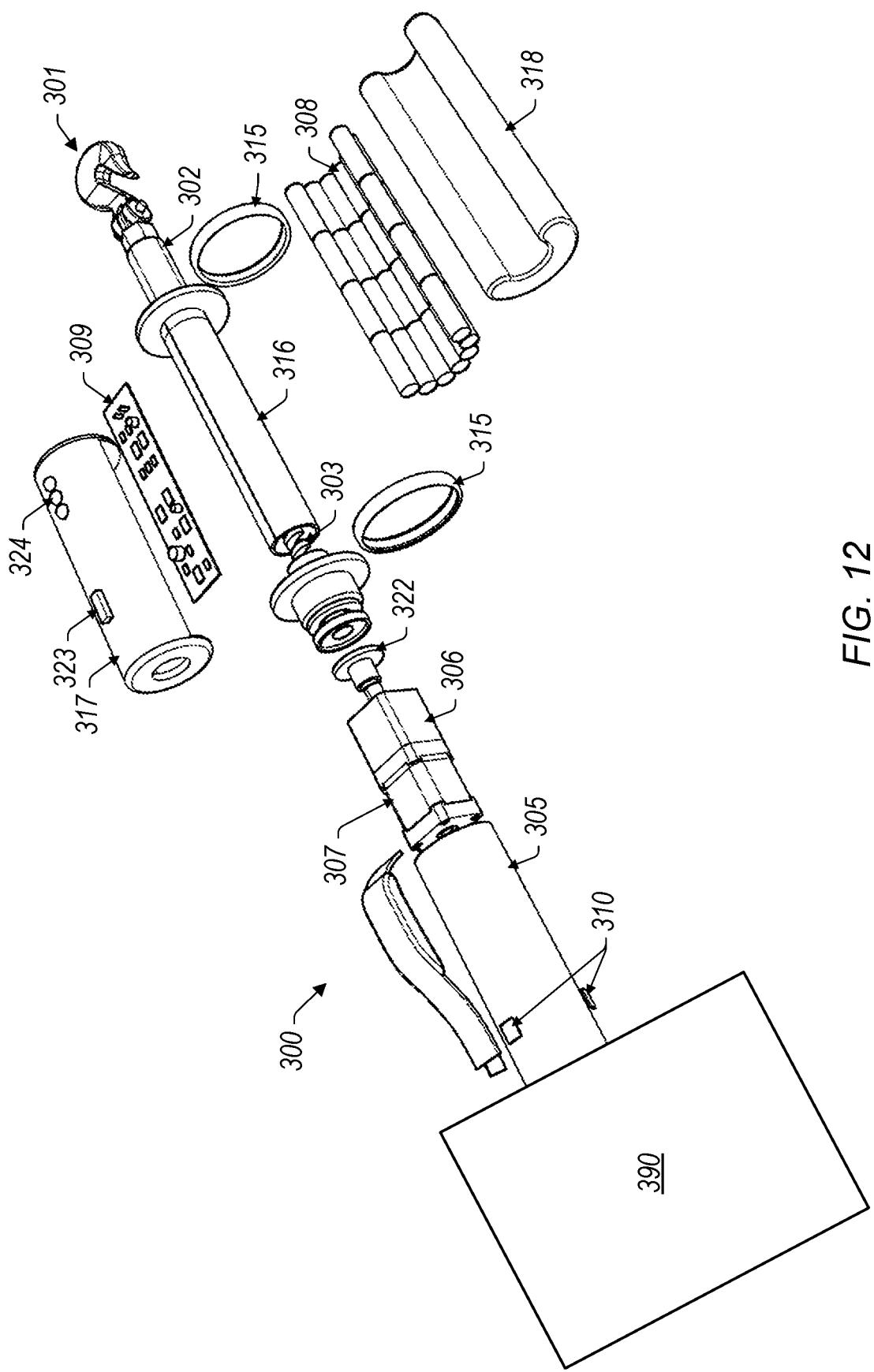
FIG. 12 is an exploded view of a cargo restrain system mounted in a vehicle.

Some embodiments of a cargo restrain system may be integrated into a vehicle. In this embodiment, a cargo restrain system, such as the cargo restrain system depicted in FIG. 11, is connected a portion of a vehicle or a trailer. For example, the cargo restraint system may be integrated into the vehicle or into the trailer being pulled by the vehicle, or both. In one embodiment, one end of a cargo restraint system is coupled to the body of the vehicle or trailer. Referring to FIG. 11, hook 311 could be replaced with a more permanent attachment to the vehicle. For example, hook 311 can be replaced with a tang or some other such connector that can be bolted to a portion of a vehicle or trailer. Alternatively, as depicted in FIG. 12, the cargo restraint system may be positioned within a channel or box 390 (covered or uncovered) coupled to the vehicle. In one embodiment, the cargo restraint system is mounted to the bottom of the vehicle.

Integration of the cargo restraint system into a vehicle and/or trailer eliminates the need to install the cargo restraint system onto one or both devices each time the device is used. In previous embodiments, the cargo restraint system is connected to the vehicle using, for example, a permanently affixed hitch on the vehicle. This previous method of using the cargo restraint system can be inconvenient since it requires the cargo restraint system to be transported to the vehicle when a load (e.g., the trailer) is going to be hooked to the vehicle.

In previous embodiments, power was provided to the cargo restraint system, primarily, using integrated batteries. Since most vehicles have their own power supply, a cargo restraint system can be integrated into the power system of the vehicle. In this manner, the power from the vehicle battery may be used to power the cargo restraint system. In an alternate embodiment, a battery dedicated to providing power to the cargo restraint system may be coupled to the vehicle (e.g., by placing the battery in box 390). These embodiments may eliminate the need for batteries to power the securement devices.

As discussed in other embodiments, an integrated cargo restraint system may include a controller/communications assembly. The controller is coupled to the tension sensors, and other components, via the communications assembly. In one embodiment, the controller monitors the tension on the load from the tension sensors. The controller can communicate with the driver to inform the driver of loose or unsecured loads. In this embodiment, the cargo restraint system is controlled through the wired communications assembly by the controller.

An advantage of using an integrated cargo restraint system is that the controller can be coupled to the various components of the cargo restraint system using a hard wire communication assembly (e.g., using Ethernet connections and cables). Use of hard wire connections can minimize communication issues that can occur when a wireless system is used.

The controller may also be coupled, through the communications assembly, to a motor used to increase or decrease the tension provided by the cargo restraint system. If the load appears to be under too little tension or too much tension, the controller may signal the motor to take the appropriate action to correct the tension.

In some embodiments, the cargo restraint system may be removably integrated into the vehicle. For example, a quick release connection may be used to secure the cargo restraint system to the vehicle body. Alternatively, the cargo restrain system may be removably coupled to a box or a channel integrated into the body of the vehicle. By allowing the cargo restraint to be readily removed, the restraint may be easily replaced or removed.

In some embodiments, a cargo restraint system may have a unique identification number or code. The identification number or code may be used to track the usage of the cargo restraint system and the tension history on a load during transportation. In one embodiment, the cargo restrain system may include one or more communication ports (e.g., an Ethernet or USB port), which allow the data to be transferred to a separate computer system for analysis. In some embodiment, the controller may also include a wireless communicator which is used to relay information obtained from the controller to a remote site. For example, a phone application may receive information from the controller during transportation, allowing the owner of the load to monitor the tension being applied to the load in real time during transportation of the load. The wireless communicator may also relay tension information to one or more remote computer system. The controller may relay tension information as the vehicle is moving. This can be used to produce a stress profile based on the location of the vehicle. The controller may also receive Federal Motor Carrier Safety Administration parameters which allow the system to ensure all restraints are meeting Federal safety standards.

In one embodiment, an auto release function may be incorporated into any cargo release system described herein. An auto release can be used to release the load without the need for any manual removal of the cargo restraint system. In one embodiment, the auto release function releases the load when the end of the stroke is reached. At this point the system is configured to release the chain from the binder automatically. The auto release function allows the driver to release chains and drive away from the load without having to leave the cabin and without having to manually disconnect chains.

Attachment of the cargo restraint system to the vehicle offers several advantages. One advantage is that the cargo restraint system is always properly located on the vehicle or trailer, and always available. This minimizes the time to locate and attach the equipment in the proper location for transport. Furthermore, having the cargo restraint system attached to the vehicle eliminates the need to handle securement devices or to connect the proximal end to equipment via chain. Another advantage is that the load securement devices are attached to the equipment in appropriate locations (retrofitted, or by OEM). Wiring to each of the devices enables power from equipment battery which eliminates the need for batteries to power the device. Software controlled via computer system enables communication to the driver of loose, or unsecured loads.

Figure 13:
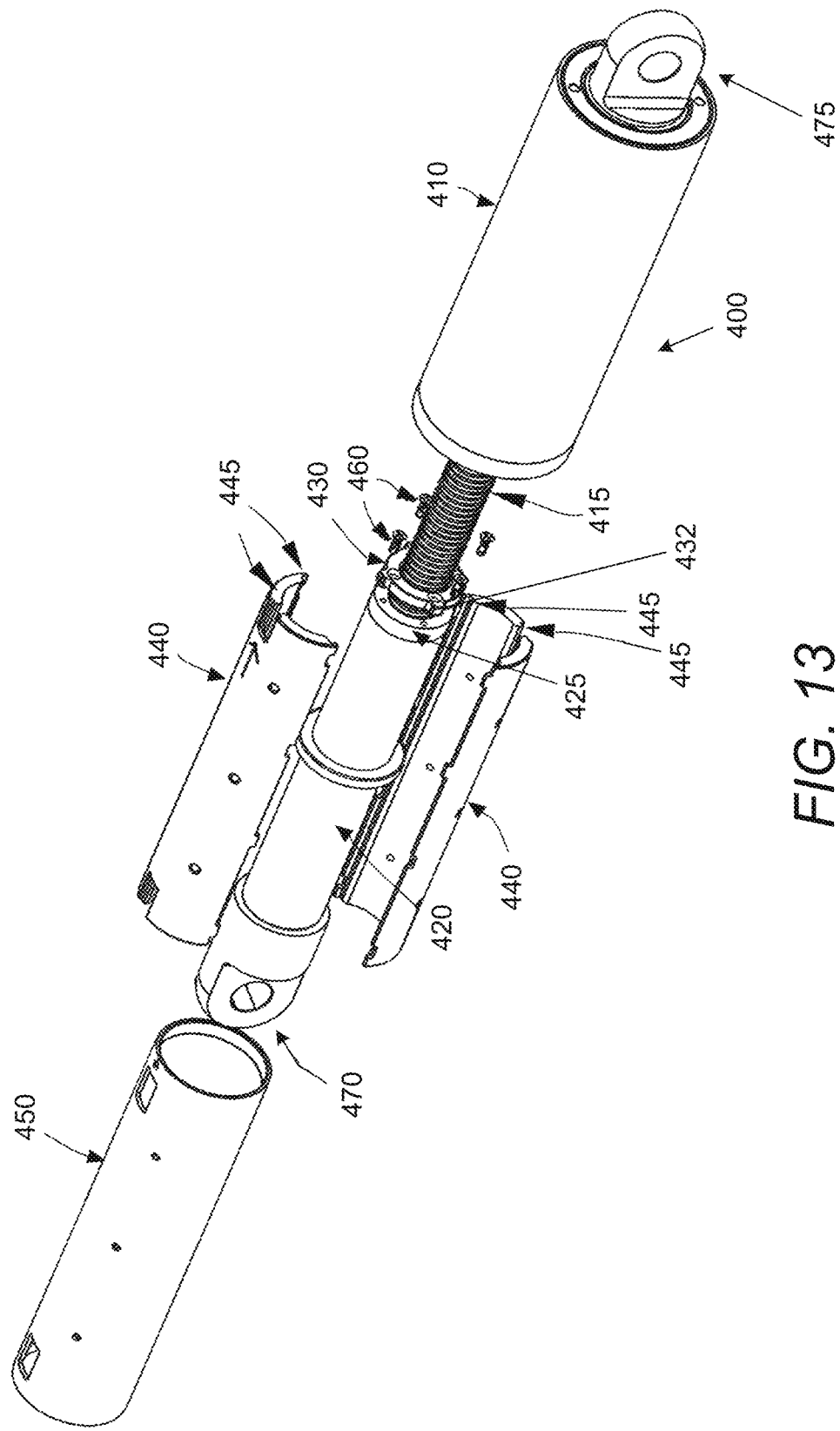
FIG. 13 is an exploded view of a cargo restrain system having a locking ring.

An additional embodiment of a cargo restraint system 400 is depicted in FIG. 13. As in the previous embodiment, a motor and power source (not shown) are positioned in a main body 410. Main body 410 is connected to extension tube 420 through drive screw 415. During use, a motor in the main body is operated, turning the drive screw as described above. Extension tube 420 is generally hollow and includes internal threading on the lead screw nut 425 complementary to the threading on drive screw 415. When drive screw 415 is rotated, extension tube 420 moves away from, or toward, main body, depending on the direction of rotation of the drive screw. Connectors, for example tangs 470 and 475, provide connection points that allow the cargo restraint system to be placed between a vehicle and a cargo carrier (e.g., a trailer).

It has been found that extension tube 420 tends to rotate as drive screw 415 is turned, making it difficult to create a tight connection. To prevent rotation of extension tube 420, a locking ring 430 is coupled to the lead screw nut 425 of the extension tube. Locking ring 430 includes an annular body having one or more tabs 432 (e.g., four tabs) which extend from the annular body, as depicted in FIG. 13. A locking tube 440 is internal to and coupled to the forward tube 450 which is coupled to the main body 410 and covers drive screw 415 and locking ring 430. Locking tube 440 includes grooves 445 which are complementary in shape and size with tabs 432 extending from locking ring 430. Locking tube 440 at surrounds the extension tube 420. Locking tube 440 comprises one or more grooves complementary to the shape and size of tabs 432 on the locking ring 430. Tabs 432 are aligned with corresponding grooves 445 in locking tube 440. Grooves 445 of locking tube 440 inhibit rotational movement of the locking ring. Locking tube 440 may be a unitary construction or, as shown in FIG. 13, a two-piece (or more) construction. Use of a two-piece construction makes assembly and alignment of grooves 445 with tabs 432 easier. A forward body 450 surrounds locking tube 440. When assembled, forward body 450 is connected to main body 410 and locking tube 440 to inhibit dirt and water from entering the system.

During typical use, a motor in main body 410 is operated to move extension tube 420 away from, or toward, main body 410. Movement of extension tube 420 away from the main body 410 reduces the tension on the system, while movement of the extension tube 420 toward main body 410 increases the tension on the system. Rotation of extension tube 420 is restricted by locking ring 430. When the motor is activated and drive screw 415 is turning, rotation of extension tube 420 tends to occur. To prevent this rotation, tabs 432 of locking ring 430 are aligned with grooves 445 of locking tube 440, allowing the locking ring to move laterally with extension tube 420 as the motor is operated. Rotational movement of extension tube 420 is restricted by tabs 432 of locking ring 430, which are embedded in grooves 445. Locking tube 440 is internal and coupled to the forward body 450 which is coupled to the non-moving main body 410. Main body 410, therefore, keeps forward body 450 and locking tube 440 from rotating, which further prevents locking ring 430 and extension tube 420 from rotating.

Additional improvements include using a break free mechanism. A break free mechanism is included to ensure that the cargo restraint system can be removed in case of any failure which would keep the motor from rotating the lead screw to release the load. When using the cargo restrain system with a chain it is difficult to rotate the device to loosen the load to remove the system once the load is tightened. Neither the main body nor the lead screw can be loosened because the chain has no slack. The lead screw is prevented from rotating because of the follower, as described above. Therefore, it is practically impossible to reduce the tension on the system by manually rotating the any of the components.

To overcome this problem, breakaway fasteners 460 (e.g., screws or bolts) are used to connect locking ring 430 to lead screw nut 425. Breakaway fasteners 460 are made from a metal that is capable of resisting shear forces created by rotation of the lead screw, but also capable of fracturing under shear created by rotation force on forward tang 470. Fasteners having a shear strength of at least about 100 mPa but less than about 1000 mPa will meet these criteria. For example, breakaway fasteners may be made of aluminum. In the case of a failure which prevents the motor from turning, an operator can place a wrench onto main body 410, or rear tang 475 and turn the forward tang 470 to break breakaway fasteners 460 holding locking ring 430 to extension tube 420. Once the extension tube 420 is free, forward tang 470 can rotate, independent of main body 410 of the cargo restrain system. Rotation of the forward tang allows extension tube 420 to rotate freely about the drive screw 415 which at that point is locked by failure of the motor to turn. This rotation allows the tension on the cargo restraint system to be released which then can be removed from the chain for repair.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A cargo restraint system comprising:
    a body;
    a motor disposed in the body;
    a drive screw coupled to the motor, extending from the body;
    an extension tube coupled to the drive screw, wherein the extension tube comprises threading complementary to the threading on the drive screw, wherein during use, rotation of the drive screw causes the extension tube to move away from the body, or move toward the body, depending on the direction of rotation of the drive screw;
    a connector coupled to the extension tube;
    a locking ring coupled to the extension tube, wherein the locking ring comprises an annular body and one or more tabs extending from the annular body; and
    a locking tube coupled to the main body and at least partially surrounding the extension tube, wherein the locking tube comprises one or more grooves complementary to the shape and size of the tabs on the locking ring, and where the grooves of the locking tube inhibit rotational movement of the locking ring.

2. The cargo restraint system of claim 1, further comprising one or more fasteners coupling the locking ring to the extension tube, wherein the fasteners are made from a material having a shear strength of at least about 100 mPa but less than about 1000 mPa.

3. The cargo restraint system of claim 2, wherein the fasteners are made from aluminum.

4. A method of restraining cargo comprising:
    coupling the ends of a cargo restraint system to a cargo carrier and a vehicle, the cargo restraint system comprising:
    a main body;
    a motor disposed in the main body;
    a drive screw coupled to the motor, extending from the main body;
    an extension tube coupled to the drive screw, wherein the extension tube comprises threading complementary to the threading on the drive screw, wherein during use, rotation of the drive screw causes the extension tube to move away from the main body, or move toward the main body, depending on the direction of rotation of the drive screw;
    a connector coupled to the extension tube;
    a locking ring coupled to the extension tube, wherein the locking ring comprises an annular body and one or more tabs extending from the annular body; and
    a locking tube at least partially surrounding the main body and the extension tube, wherein the locking tube comprises one or more grooves complementary to the shape and size of the tabs on the locking ring, and where the grooves of the locking tube inhibit rotational movement of the locking ring; and
    operating the motor to increase the tension on the securing member to secure the cargo.

5. The method of claim 4, wherein the cargo restraint system further comprises one or more fasteners coupling the locking ring to the extension tube, wherein the fasteners are made from a material having a shear strength of at least about 100 mPa but less than about 1000 mPa and wherein the method further comprises:
    creating a rotational force on the main body sufficient to shear the fasteners;
    rotating the connector to loosen the tension of the cargo restraint system.

6. The method of claim 5, wherein the fasteners are made from aluminum.

\* \* \* \* \*